No. 664,160. Patented Dec. 18, 1900.
P. C. LEIDICH.
MOTOR DRIVEN VEHICLE.
(Application filed Sept. 25, 1899.)
(No Model.) 2 Sheets—Sheet 1.
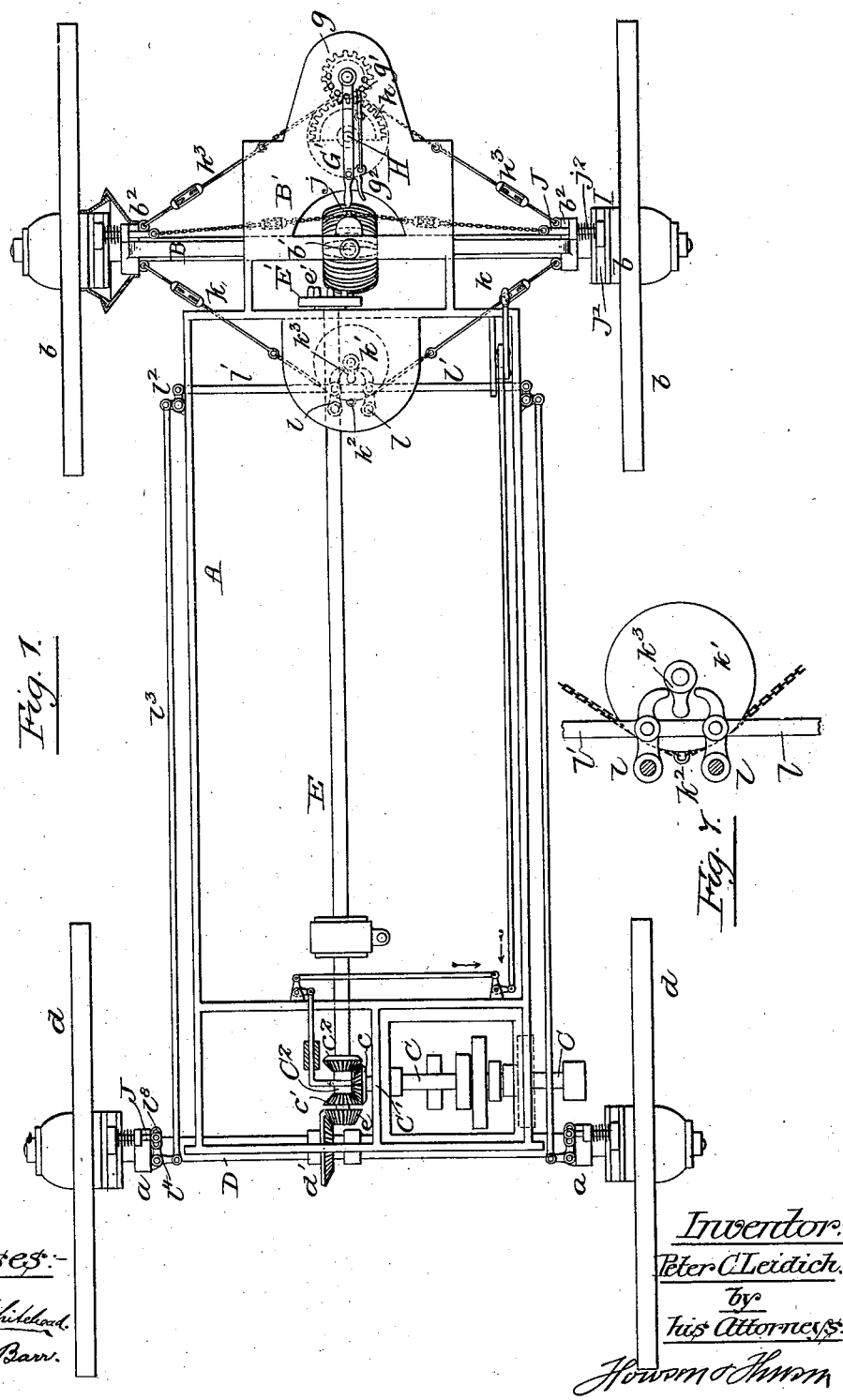

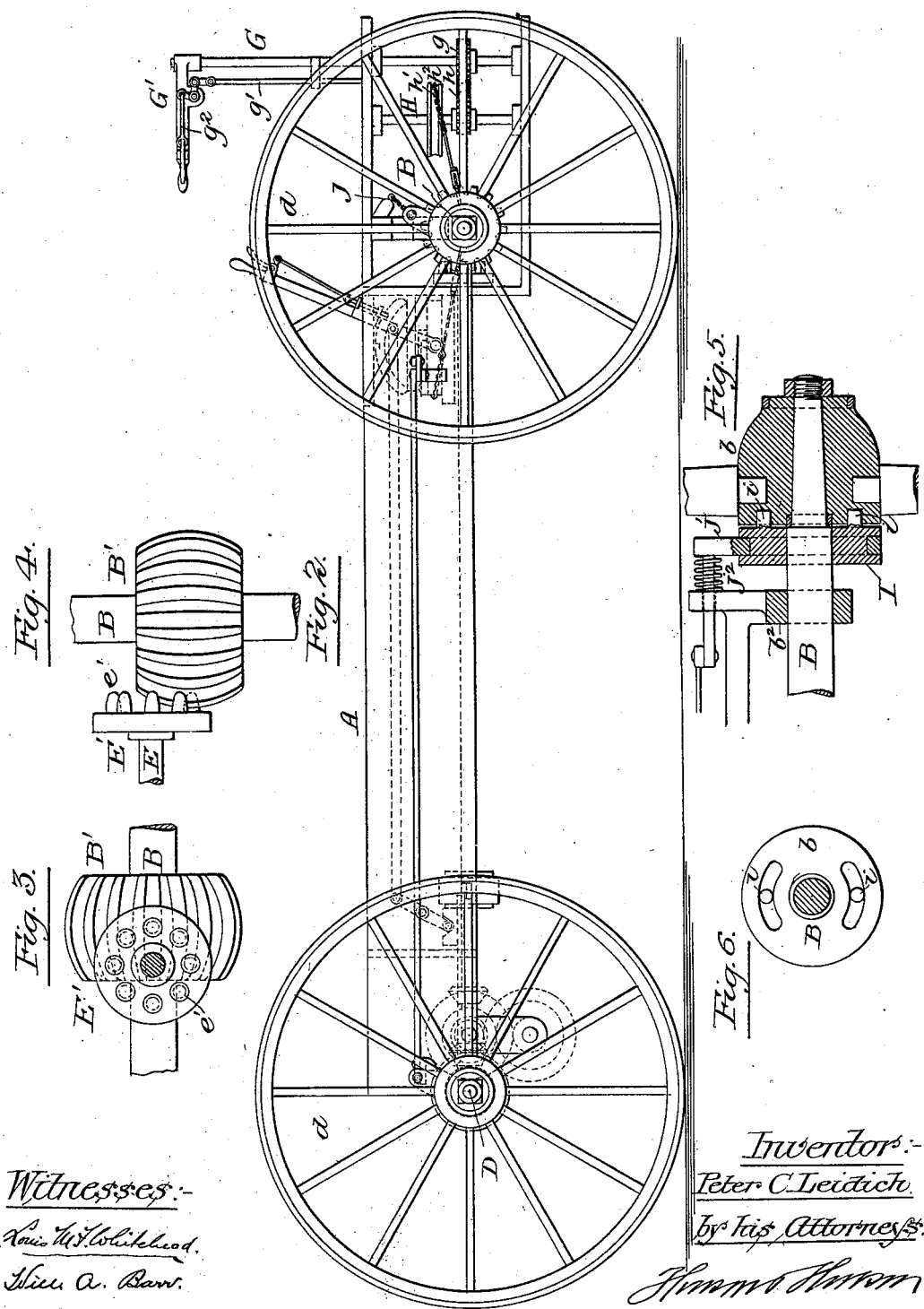

UNITED STATES PATENT OFFICE.

PETER C. LEIDICH, OF TAMAQUA, PENNSYLVANIA, ASSIGNOR, BY DIRECT AND MESNE ASSIGNMENTS, OF THREE-EIGHTHS TO GEORGE H. FOCHT, WILLIAM WHARTON HOLLINGSWORTH, AND MARGARET D. ATKINSON, OF PHILADELPHIA, PENNSYLVANIA.

MOTOR-DRIVEN VEHICLE.

SPECIFICATION forming part of Letters Patent No. 664,160, dated December 18, 1900.

Application filed September 25, 1899. Serial No. 731,624. (No model.)

*To all whom it may concern:*

Be it known that I, PETER C. LEIDICH, a citizen of the United States, and a resident of Tamaqua, Schuylkill county, Pennsylvania, have invented certain Improvements in Motor-Driven Vehicles and Gearing, of which the following is a specification.

The main object of my invention is to construct an improved gear by which shafts at an angle to each other will be geared together and yet will allow one of the shafts to vibrate on a center without throwing the wheels out of engagement and without increasing or diminishing the speed of the driven shaft.

A further object of my invention is to so arrange the gear in connection with a motor-driven vehicle that both the front and back axles can be driven and yet one of the axles can be pivoted on a king-bolt to allow the vehicle to be turned.

My invention relates, further, to details of construction fully described hereinafter.

In the accompanying drawings, Figure 1 is a plan view of a motor-driven vehicle embodying my invention. Fig. 2 is a side view. Figs. 3 and 4 are views of my improved gearing. Figs. 5 and 6 are details of the mechanism for clutching one of the wheels in engagement with the shaft, and Fig. 7 is a detail of the invention.

A is the vehicle-body.

B is the front axle, and D the rear axle.

$b\ b$ are the front wheels, and $d\ d$ are the rear wheels.

It will be understood at the outset that the shape of the body can be modified, as well as the form of the wheels, without departing from my invention, as the structure will be designed according to the use for which it is intended.

C is a motor-shaft adapted to suitable bearings in the frame of the vehicle and can be driven by any suitable motor mounted on the vehicle-frame. I have shown back-gearing by which the speed of the main shaft can be reduced.

On the end of the driven shaft $C'$ is a bevel-wheel $c$, which is adapted to mesh with either of the bevel-wheels $c'$ or $c^2$ on the driven shaft E. These bevel-wheels are mounted on a sleeve $C^2$ on the shaft E, so that by moving the sleeve in one direction the wheel $c'$ will be in gear with the wheel $c$, and by moving the sleeve in the opposite direction the wheel $c^2$ will be in gear with the wheel $c$. Thus the movement of the shaft can be reversed by simply operating the sleeve.

On the shaft E is a bevel-wheel $e$, meshing with a bevel-wheel $d'$ on the rear axle D. The axle or shaft D is adapted to suitable fixed bearings $a\ a$ on the body of the vehicle.

The front axle B is swiveled on a king-bolt $b'$, projecting from the frame of the vehicle, so that the axle can be turned on its king-bolt or pivot to direct the course of the vehicle. On the axle of shaft B is a gear-wheel $B'$ of the form clearly illustrated in Figs. 3 and 4, having its face curved on a radius from the center line of the shaft and the teeth corresponding to this curvature. Meshing with this gear is a pin gear-wheel $E'$ on the end of the shaft E. This pin-wheel has a series of pins $e'$, as clearly shown in Figs. 3 and 4, which enter the spaces between the teeth of the wheel B, and as the shaft E is turned a rotary motion is imparted to the axle or shaft B through the medium of the gear-wheels $E'$ and $B'$. It will be noticed that the spaces between the teeth of the gear-wheel $B'$ are of an even width throughout, and to accomplish this the teeth are tapered, being thicker at the center than at the ends, and the teeth $e'$ of the wheel $E'$ enter the spaces between the teeth of the wheel $B'$ as a worm and continue this movement until they resolve themselves at the center into a plain gear. If the axle or shaft B is turned so as to turn the vehicle, the pins $e'$ still remain in gear with the wheel $B'$, so that by this arrangement I am enabled to construct a vehicle having two driven axles or shafts, one of which is pivoted so that the direction of travel of the vehicle can be controlled and to gear both axles to a single motor.

The axle B can be turned on its king-bolt or pivot by means of an operating-handle $G'$ on the upright shaft G, which has a gear-wheel $g$, meshing with a segment $h$ on the shaft H, adapted to bearings on the frame. The shaft G can be locked in its adjusted position by means of the bolt $g'$, operated by a handle $g^2$, and this bolt is adapted to any one of a series of openings in the frame of the vehicle.

Attached to a wheel $h'$ on the shaft H is a chain $h^2$, connected to rods $h^3$, which in turn are connected to collars $b^2$, loose on the axle or shaft B, so that on turning the handle G' toward the right the axle B will be so turned that the vehicle will be directed toward the right and when the handle is turned toward the left the vehicle will be directed toward the left.

On each axle is a loose sleeve I, having pins $i$, which enter recesses in the hubs of the wheels $b$ and $d$, as clearly shown in Figs. 5 and 6. These sleeves I can be moved into and out of engagement with the hubs, and as the sleeves are splined to the axles B and D they turn with them and will lock the wheels to the shafts, so that they will be driven; but when it is wished to direct the vehicle out of a straight course—for instance, to make a sharp turn—it is desirable to throw two of the driven wheels out of engagement with the shaft, as the wheels taking the short curve will travel over less surface than the wheels taking the large curve. Consequently I so arrange the shifting mechanism that when the vehicle is turned to the right the outer wheels—that is, the wheels on the left-hand side of the vehicle—are free to rotate on their axles and when the vehicle is turned to the left the wheels on the right-hand side of the vehicle are free to rotate on their axles. I accomplish this by connecting rods or chains to a fixed point $j$ on the frame of the machine and connect these rods or chains to bars J, which are attached to rings J', encircling the sleeves I. Springs $j^2$, mounted between the bearing and the ring, tend to force the ring and its sleeve toward the hub, throwing the pins $i$ into engagement with the slots in the hub.

When the vehicle is going forward in a straight line, the normal position of the parts is such that the pins will be in engagement with the hubs and the hubs will turn with the axle or shaft; but if it is desired to turn the vehicle and the operator turns the front axle B tension is applied to the rods and one of the sleeves is withdrawn from engagement with its wheel, so that that wheel is free to rotate on its axis, while the other wheel is driven by the axle. In the present instance the wheel making the shortest curve is free to rotate independently of its axle.

In some instances it is not necessary to provide this mechanism for the rear axle; but it is desirable where possible, and to accomplish this I extend rods or chains $k\,k$ from the bar $b^2$ to a wheel $k'$ and attach the chains at $k^2$ to the said wheel. On the wheel is a projection $k^3$, and pivoted to the frame on each side of the projection are levers $l\,l$, connected by rods $l'$ to bell-crank levers $l^2$, which are in turn connected to rods $l^3$, extending to the rear of the vehicle, and this rod in turn is connected to a bell-crank lever $l^4$, engaging with the bar J, connected to the sleeve on the rear axle or shaft, so that when the front axle is turned to a certain point the wheel $k'$ is also turned and acts upon either of the levers $l\,l$ and throws either one or the other of the rear wheels $d$ out of engagement with the axle D. The reversing-lever for shifting the sleeve $C^2$ may be carried to a suitable point within easy reach of the operator. Thus it will be seen that I am enabled by my improved gearing to drive both the front and rear axles of a vehicle in which the front or rear axle is pivoted by positive driving mechanism, and I am enabled to throw the wheels on either side out of gear with the axles automatically by turning the steering-lever.

It will be understood that my improved gearing may be applied to any mechanism in which it is desired to drive one shaft at an angle to a driving-shaft and at the same time to change the angle of the driven shaft without changing the relation of the gearing.

I claim as my invention—

1. In a gearing, the combination of a driving-shaft mounted in fixed bearings and carrying a pin-wheel as a power-transmitting medium, a driven shaft pivotally mounted so as to be capable of swinging at an angle to the driving-shaft, and a wide-faced gear-wheel mounted on said driven shaft and having its teeth engaged by pins projecting from the wheel of the driven shaft, said gear-wheel having its periphery curved on the arc of a circle taken from the center of the wheel, substantially as described.

2. The combination of a driving and a driven shaft, the driven shaft adapted to turn on a pivot, a gear-wheel mounted on said shaft at the pivot-point of the same and having a face curved on the arc of a circle taken from said pivot-point, and a wheel on the driving-shaft having pins projecting from its face and entering the spaces between the teeth of the gear-wheel on the driven shaft, said spaces being of the same width from end to end, substantially as described.

3. The combination in a power-driven vehicle, of front and rear axles, one of said axles being pivoted, a driven shaft at right angles to the axles and bevel-gears by which the axle adapted to fixed bearings is geared to the driving-shaft, and gearing connecting said driven shaft to the pivoted axle, said gearing consisting of a wide-faced gear having a curved surface adapted to the pivoted axle, and a pin-wheel on the end of the driving-shaft, the pins of which engage with the teeth of the wide-faced gear-wheel, substantially as described.

4. The combination in a motor-driven vehicle, of the body having a front axle and a rear axle, a pivot on which the front axle is adapted to swing, a shaft having a wheel, a chain adapted to the wheel and connected to the bearing of the front axle, so that the said front axle can be turned when the said shaft is turned, a driving-shaft geared positively to the front and rear axles, with means for throwing one or both wheels on one side of the vehicle out of gear with their axles, substantially as described.

5. The combination in a motor-driven vehicle, of the body, the rear axle adapted to fixed bearings, the front axle adapted to pivoted bearings, a driving-shaft, bevel-gears by which the rear axle is driven by the driving-shaft, a universal gear by which the shaft is geared to the front axle so that it will be always in gear therewith, means for turning the front axle and means for throwing one or both wheels on one side of the vehicle out of gear when the vehicle is turning a curve, substantially as described.

6. The combination of the body of a vehicle, front and rear axles therefor, wheels loose on said axles, the hubs of said wheels having recesses, a sleeve on each axle having pins engaging the recesses in their respective hubs, means for turning the front axle, and means operatively connected therewith whereby the pins are drawn from the hubs of the front and rear wheels on one side of the vehicle simultaneously, so that said wheels will revolve free of their axles when said front axle is turned, substantially as described.

7. The combination of a vehicle-body, the front axle B, rear axle D, wheels loose thereon, the hub of each wheel having recesses, sleeves on each axle having pins adapted to enter the recesses in the hubs, means for turning the front axle on its pivot, rods or chains connected to the pins and to a fixed point on the vehicle-body so that when the front axle is turned the pins will be withdrawn from engagement with the wheel on one side of the vehicle, a wheel $k'$, chains passing around said wheel and coupled to the bearings of the pivoted axle, a pin projecting from said wheel, levers $l\ l$ on each side of the pin and adapted to be acted upon by said pin, said levers being coupled to the sleeves on the rear axles so that both the front and rear wheels on one side will be detached from their axles simultaneously, substantially as described.

In testimony whereof I have signed my name to this specification in the presence of two subscribing witnesses.

PETER C. LEIDICH.

Witnesses:
G. S. A. WALKER,
C. S. SHINDEL.